United States Patent
Viglione et al.

(10) Patent No.: US 7,334,950 B2
(45) Date of Patent: Feb. 26, 2008

(54) QUICK-CHANGE SHUTTER ASSEMBLY

(75) Inventors: David J. Viglione, Rochester, NY (US); Adam J. Lamb, West Henrietta, NY (US); Stephen T. Pasquarella, Rochester, NY (US)

(73) Assignee: VA, Inc., Rochester, NY (US)

( * ) Notice: Subject to any disclaimer, the term of this patent is extended or adjusted under 35 U.S.C. 154(b) by 358 days.

(21) Appl. No.: 10/908,031

(22) Filed: Apr. 26, 2005

(65) Prior Publication Data
US 2006/0239681 A1    Oct. 26, 2006

(51) Int. Cl.
G03B 9/08 (2006.01)
G03B 17/02 (2006.01)

(52) U.S. Cl. ............................ 396/452; 396/541

(58) Field of Classification Search ........ 396/449–451, 396/458, 462, 497, 500, 501, 505, 508, 510, 396/541, 544; 348/362, 367, 368, 373–375; 352/141, 204, 207, 208
See application file for complete search history.

(56) References Cited

U.S. PATENT DOCUMENTS

| | | | | |
|---|---|---|---|---|
| 2,439,087 A | * | 4/1948 | Harvey ........................ 396/452 |
| 4,063,263 A | * | 12/1977 | Krewalk, Sr. ................ 396/494 |
| 5,029,309 A | * | 7/1991 | Jones ........................... 396/155 |
| 5,223,112 A | | 6/1993 | Tepman |
| 5,528,328 A | * | 6/1996 | O'Farrill et al. ............. 396/544 |
| 6,652,165 B1 | | 11/2003 | Pasquarella et al. |
| 6,817,788 B1 | * | 11/2004 | Negishi et al. .............. 396/505 |
| 2003/0147642 A1 | * | 8/2003 | Nishimoto ................... 396/505 |
| 2005/0238347 A1 | * | 10/2005 | Oh ............................... 396/449 |
| 2006/0029385 A1 | * | 2/2006 | Huang ......................... 396/452 |
| 2006/0093351 A1 | * | 5/2006 | Lee .............................. 396/505 |

* cited by examiner

Primary Examiner—W. B. Perkey
(74) Attorney, Agent, or Firm—Stephen B. Salai; Brian B. Shaw; Harter Secrest & Emery LLP

(57) ABSTRACT

A shutter assembly for an optical system includes a shutter housing that maintains optical alignments with adjoining parts of the optical system and a shutter mechanism that can be removed and replaced within the shutter housing without disturbing the optical alignments between the shutter housing and the adjoining parts of the optical system. The shutter mechanism can also include alignment features with the shutter housing for restoring the original optical alignment of the shutter mechanism with the adjoining parts of the optical system.

10 Claims, 4 Drawing Sheets

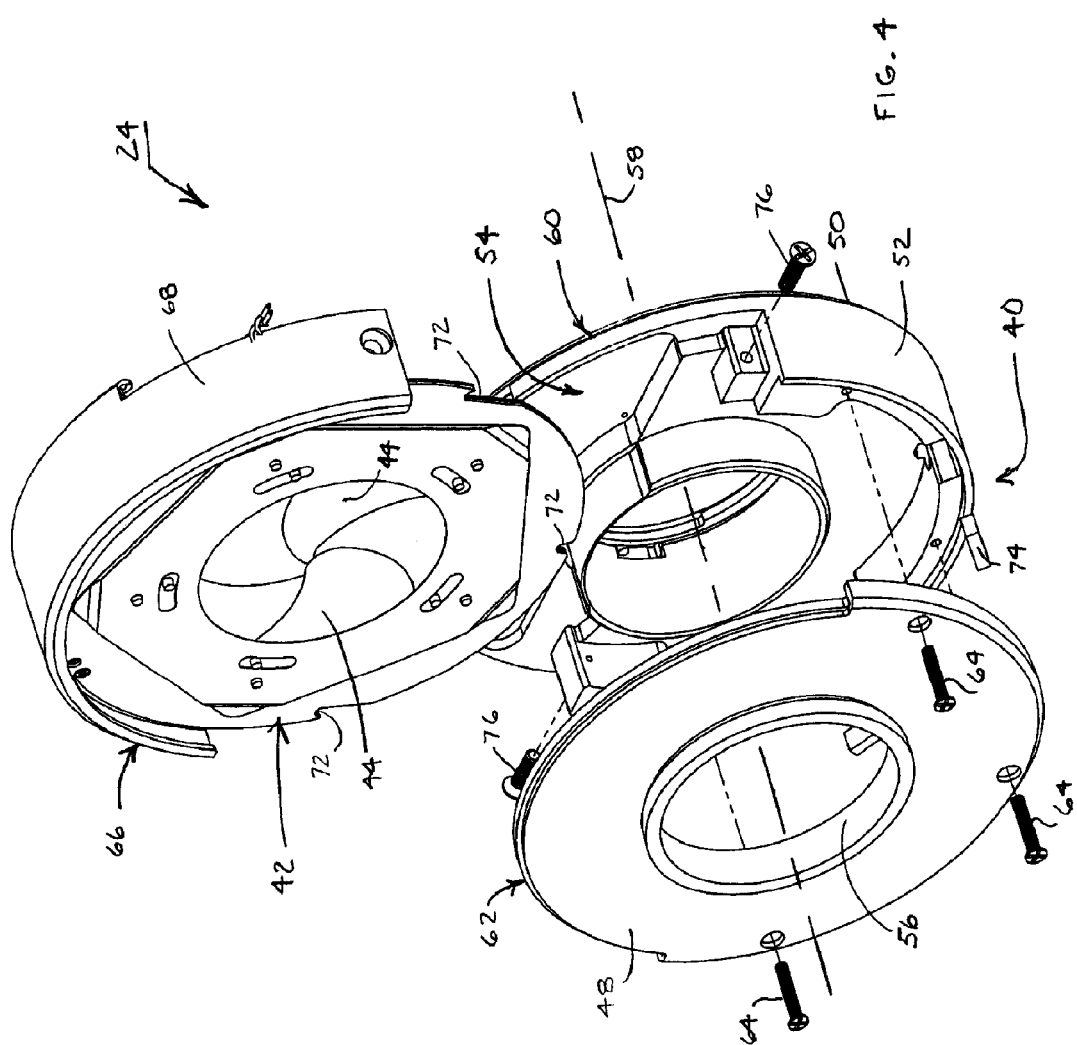

QUICK-CHANGE SHUTTER ASSEMBLY

FIELD OF THE INVENTION

This invention relates generally to optical shutters for systems such as machine vision systems, microscopes, video imaging equipment, and other optical systems that include cameras, multiple cameras, lens systems, lighting, or other optical components that must be aligned to produce good results, and more particularly, to mounting systems for installing and replacing optical shutters within the optical systems while preserving the alignment of the optical systems.

DESCRIPTION OF RELATED ART

Shutters of the type with which this invention is concerned are available from a variety of sources in a variety of forms, including multi-blade shutters that are electro-mechanically actuated. Examples of such shutters include the UNIBLITZ® line of shutters offered by Vincent Associates of Rochester, N.Y. The UNIBLITZ® shutters include electro-programmable shutters with built-in electronic circuits that control the shutters.

The shutters are generally integrated with other components of optical devices, and the shutters are accessible for such purposes of cleaning, repair, or replacement by disassembling adjoining parts of the optical devices. In addition, the optical devices must often be removed from their mounts or settings within larger instruments or systems, such as machine vision systems, to achieve the needed access to the embedded shutters.

The removal of optical devices from the larger systems of their use (e.g., machine vision systems) together with the disassembly of adjoining components of optical devices to obtain appropriate access to the embedded shutters can be difficult and time consuming. However, even more difficult and time consuming is the subsequent reassembly of the adjoining optical components and remounting of the optical devices in the larger systems. The reassembly and remounting of the optical devices often requires precise realignment of the optical components within the optical devices as well as precise realignment of the optical devices within their larger system of use. Many hours of time can easily be spent restoring the system to its intended form after accessing or replacing a shutter.

For example, machine vision systems, which are quite complex, can include multiple cameras, shutters, light sources, and various fittings and fixtures all of which must be carefully aligned for the vision systems to function properly. Some such systems take a day or more to align. If a shutter, mounted in such a system using one of the known mounting techniques, needs to be replaced, the system must be disassembled at least in part, the shutter replaced, and the system reassembled. It is almost always necessary to realign at least the portion of the system that was disassembled before the system can be used.

It is an object of this invention to provide a shutter mounting system for use in optical devices and larger optical systems that overcomes one or more of the disadvantages mentioned above.

BRIEF SUMMARY OF THE INVENTION

The invention in one or more of its preferred embodiments provides a modular mounting of a shutter mechanism within an optical system so that the shutter mechanism can be removed and replaced (i.e., remounted) within the optical system without disturbing the optical alignment of adjoining optical components. In addition, the shutter mechanism itself can include self-alignment features so that the shutter mechanism can be remounted without disturbing its intended alignment with the adjoining optical components. Considerable time, effort, and expense can be saved in this way. In addition, the improved access to shutter mechanisms allows for cleaning, repairing, and even replacing the shutter mechanisms as more routine operations to maintain or upgrade optical systems.

For example, a camera and lens system having a replaceable shutter in accordance with the invention can include a camera for capturing optical information and a lens system in optical alignment with the camera for relaying optical information to the camera. A shutter assembly regulates the passage of light through an aperture between the camera and the lens system. The shutter assembly includes a shutter housing mounted between the camera and the lens system and a shutter mechanism. The shutter mechanism is received by the shutter housing in a position for regulating the passage of light through the aperture and can be removed from the shutter housing without disturbing the optical alignment between the camera and the lens system.

The shutter housing preferably serves the purpose of maintaining the desired alignment between the camera and lens system while also providing access to the shutter mechanism. In addition, the shutter housing and shutter mechanism preferably share mating features for locating the shutter mechanism in optical alignment with the camera and lens system.

The camera and lens system are preferably aligned along a common optical axis and the mating features center the shutter mechanism within the aperture and constrain angular motion of the shutter mechanism about the common optical axis. The shutter housing preferably includes an exterior opening through which the shutter mechanism can be received and removed. A first end of the shutter housing is preferably connected to the camera and a second end of the shutter housing is preferably connected to the lens system for maintaining optical alignment between the camera and the lens system. However, the lens system can be both detachable from and re-attachable to the second end of the shutter housing.

Another example of the invention as a light propagating system having a removable shutter includes a light-propagating element and a shutter housing aligned with the light-propagating element along a common optical axis. The shutter housing has a first end connected to the light propagating element, a second end spaced from the first end along the common optical axis, and a periphery between the two ends having a peripheral opening. An aperture formed through the shutter housing permits the propagation of light along the common optical axis. A shutter mechanism regulates the propagation of light through the aperture. The shutter housing includes mounting features that (a) are engageable with the shutter mechanism for mounting the shutter mechanism in an operative position for regulating the propagation of light through the aperture and (b) are disengageable from the shutter mechanism for removing the shutter mechanism through the peripheral opening without altering the optical alignment of the shutter housing with the light propagating element.

Preferably, the mounting features of the shutter housing are also reengageable with the shutter mechanism for remounting the shutter mechanism in its operative position without altering the optical alignment of the shutter housing with the first light-propagating element. In addition, the mounting features of the shutter housing preferably optically align the shutter mechanism with the light-propagating element along the common optical axis. For example, the mounting features can include at least two locating surfaces for engaging mating features of the shutter mechanism and for centering the shutter mechanism within the aperture in alignment with the common optical axis.

A closure member preferably surrounds a portion of the shutter mechanism and engages the shutter housing for closing the peripheral opening. A fastener can be used for securing the closure member to the shutter housing. A shutter actuator coupling is preferably operative through the closure.

The shutter housing preferably includes a first shutter housing portion forming the first end of the shutter housing and a part of the housing periphery and a second housing portion forming the second end of the shutter housing, and the first and second housing portions are fastened together leaving a gap in the housing periphery forming the peripheral opening. The closure member preferably surrounds the shutter mechanism and is engageable with both the first and second housing portions for closing the peripheral opening.

The light-propagating element is preferably a first of two light propagating elements that are aligned along a common optical axis. The first end of the shutter housing is preferably connected to the first light-propagating element, and a second end of the shutter housing is preferably connected to a second of the light propagating elements. The shutter housing maintains the optical alignment between the first and second light propagating elements while the shutter mechanism is engaged or disengaged from the shutter housing.

Another example of the invention emphasizing a modular aspect of the invention features a shutter assembly for mounting a removable shutter within an optical system. A shutter housing is mounted among components of the optical system that are aligned along a common optical axis. A cartridge carrier incorporates a shutter mechanism. The shutter housing has an aperture for propagating light along the common optical axis and a peripheral opening through which the shutter mechanism can be inserted into an operative position for regulating the propagation of light along the common optical axis. The cartridge carrier is (a) engageable with the shutter housing for securing the shutter mechanism in its operative position and (b) disengageable from the shutter housing for removing the shutter mechanism from the shutter housing.

The engagement of the cartridge carrier with the shutter housing preferably closes the peripheral opening in the shutter housing. The shutter housing and the cartridge carrier preferably include mating features for locating the shutter mechanism in optical alignment with the components of the optical system along the common optical axis.

The shutter housing preferably includes a cartridge case and a cartridge cover that are assembled together preserving the peripheral opening for removing the shutter mechanism from the shutter housing. The cartridge case and the cartridge cover preferably define between them a slot in communication with the peripheral opening for receiving the shutter mechanism in its operative position.

A first of the optical components can be attached to a first end of the shutter housing, a second of the optical components can be attached to a second end of the shutter housing, and the cartridge carrier together with shutter mechanism can be both disengageable from the shutter housing for removing the shutter mechanism from the shutter housing and reengageable with the shutter housing for securing the shutter mechanism in its operative position without altering an optical alignment between the first and the second optical components along the common optical axis.

BRIEF DESCRIPTION OF THE SEVERAL VIEWS OF THE DRAWING(S)

FIG. 4 is an exploded perspective view of the shutter assembly showing the shutter housing as an assembly of a carriage case and a carriage cover, and showing the shutter mechanism as a part of a carriage carrier.

DETAILED DESCRIPTION OF THE INVENTION

Figure 1:
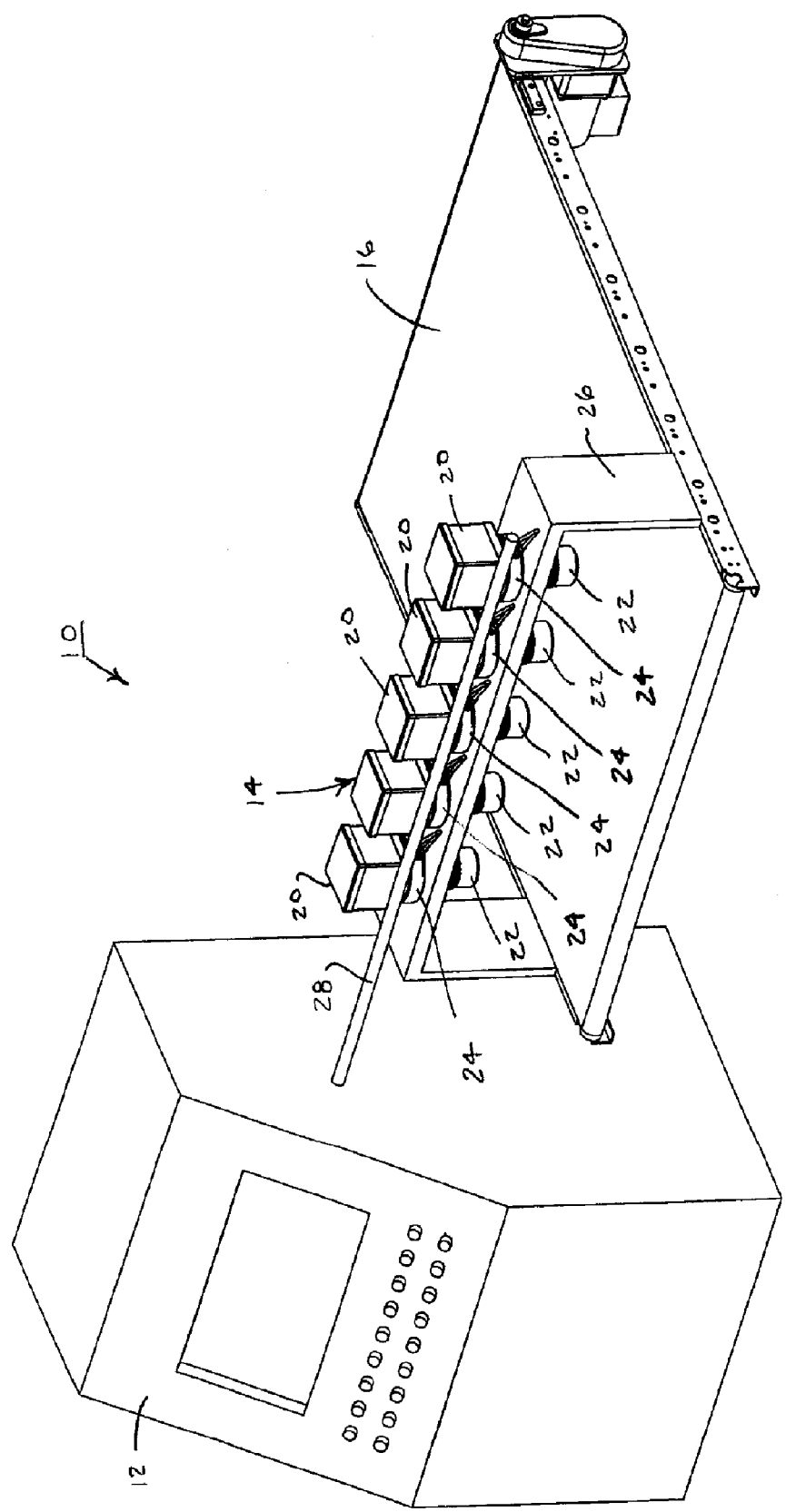
FIG. 1 is a perspective view of a multi-camera machine vision system in accordance with an embodiment of the invention.

An optical system benefiting from the invention is illustrated in FIG. 1 in the form of a multi-camera machine vision system 10. Included within the machine vision system 10 are an inspection console 12, an array of cameras 14 connected to the console 12, and a conveyer 16 for transporting parts (not shown) past the camera array 14.

Figure 2:
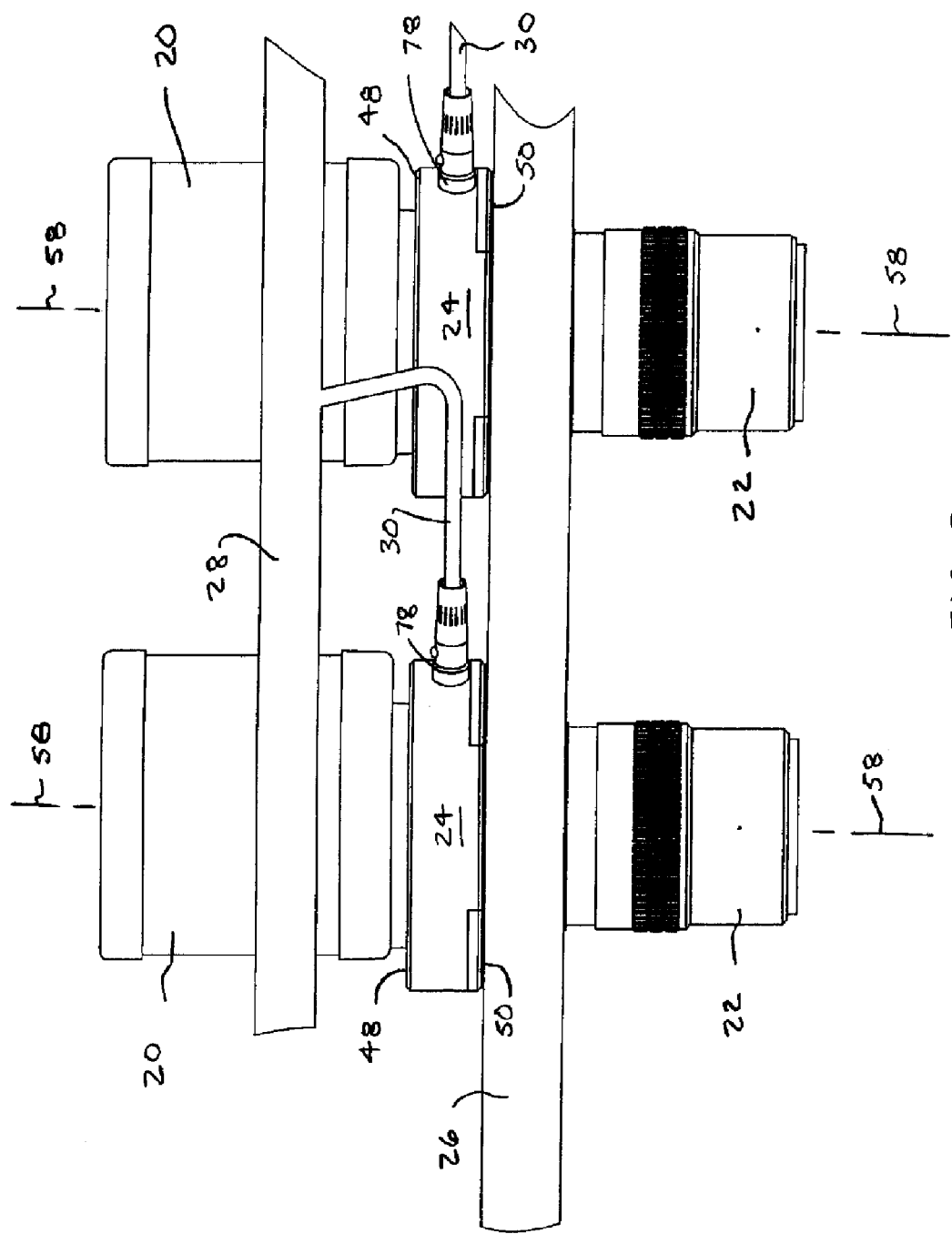
FIG. 2 is a side view of two cameras of the machine vision system mounted along a common fixture.

The camera array 14 includes a plurality of camera bodies 20 and associated lenses 22 mounted along a camera fixture 26 that extends across the conveyer 16 for inspecting parts transported beneath the camera array 14 by the conveyer 16. A data cable 28 connects the camera array 14 to the console 12 for transmitting images collected by the camera bodies 20 to the console 12 for analysis. In addition, resting on the camera fixture 26 are shutter assemblies 24 that form a connection between camera bodies 20 and their the associated lenses 22 for regulating the propagation of light through the lenses 22 into the camera bodies 20. Shutter cables 30, shown best in FIG. 2, connect the data cable 28 to the shutter assemblies 24 for supporting programmed control over the operation of the shutter assemblies 24 from the console 12.

Figure 3:
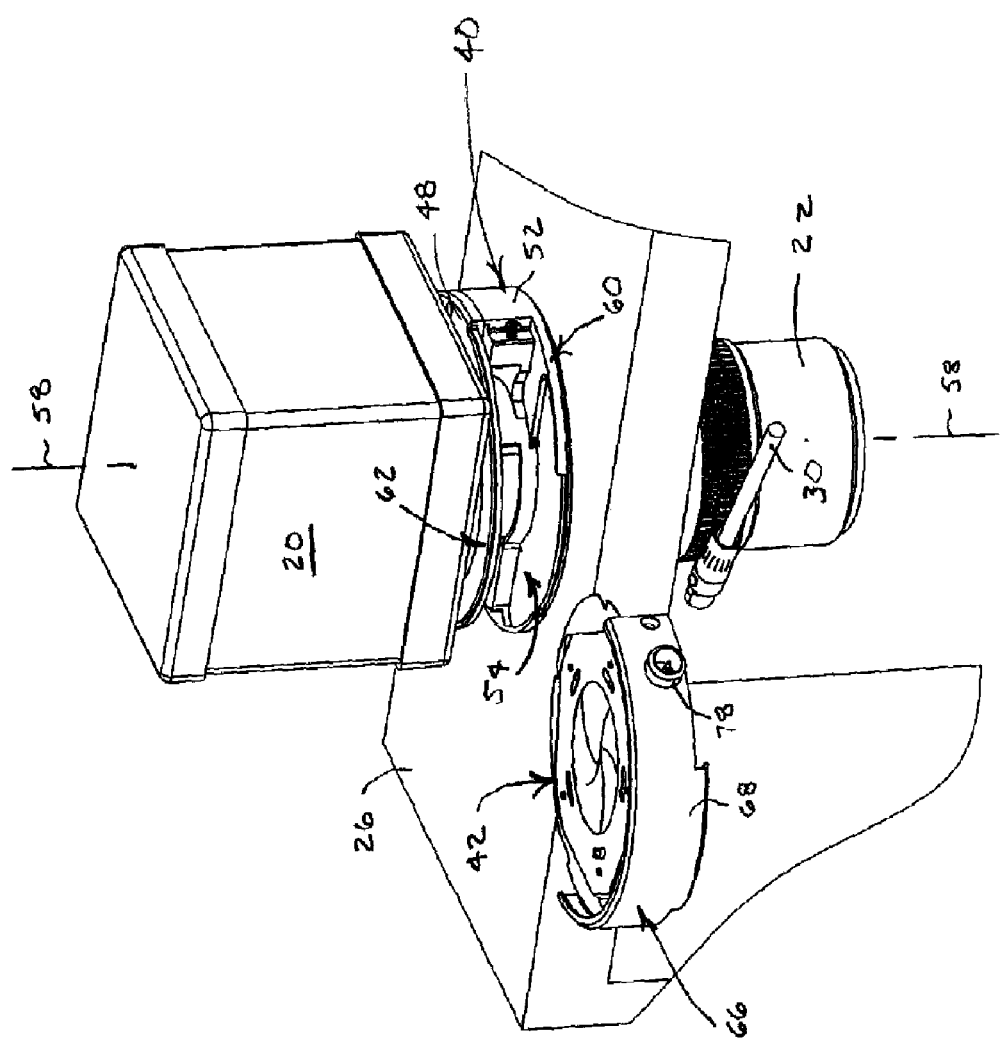
FIG. 3 is a perspective view of one of the cameras showing a shutter assembly having a shutter housing in place for maintaining a camera body aligned with a lens and a shutter mechanism that is withdrawn from the shutter housing.

One of the shutter assemblies 24, which are a subject of improvement by the invention, can be viewed in greater detail in FIGS. 3 and 4. In general, the shutter assemblies 24 include a shutter housing 40 and a shutter mechanism 42 that is removeably mounted within the shutter housing 40. The illustrated shutter mechanism 42 is of the rotary blade type, where rotation of a ring (not shown) causes blades 44 to swing in unison between open and closed positions. However, other types of shutters including so-called "guillotine" shutters, where only one or two blades are pivoted between open and closed positions, could also be used. The illustrated shutter mechanism 42 is operated via the shutter cable 30 through an electromechanical actuator system, such as disclosed in co-assigned U.S. Pat. No. 6,652,165, which is hereby incorporated by reference, but other actuators including mechanical actuators could also be used for opening and closing the shutter mechanism 42.

The shutter housing 40 has a first end 48 connected to the camera body 20, a second end 50 connected to the lens 22, and an arcuate periphery 52 having a peripheral opening 54 for receiving the shutter mechanism 42. An aperture 56 formed through the shutter housing 40 permits the propagation of light along an optical axis 58 through the lens 22 into the camera body 20.

The shutter housing 40 is assembled from a cartridge case 60 and a cartridge cover 62, each forming an axial section of the aperture 56. The cartridge cover 62 forms the first end 48 of the shutter housing 40, and the cartridge case 60 forms the second end 50 of the shutter housing. The cartridge case 60 and the cartridge cover 62 are assembled and fastened together using screws 64 while preserving the peripheral opening 54 between them.

The shutter mechanism 42 is carried within a cartridge carrier 66, which includes an arcuate closure member 68 that partly surrounds the shutter mechanism 42 and is sized for closing the peripheral opening 54 in the shutter housing 40. A shutter actuator coupling 78 extends through the closure member 68 for connecting the shutter cable 30 to the electromechanical actuator (not shown) of the shutter mechanism 42. The shutter mechanism 42 together with the cartridge carrier 66 is received through the peripheral opening 54 in the shutter housing 40 into an operative position for regulating the passage of light through the aperture 56.

The three fastening screws 64 form mounting and locating surfaces that are engaged by mating features of the shutter mechanism 42 in the form of notches 72 for centering the blades 44 of the shutter mechanism 42 within the aperture 56 and for constraining angular motion of the shutter mechanism 42 about the common optical axis. Spacers 74 define a limited axial spacing in the form of a slot between the cartridge case 60 and the cartridge cover 62 for constraining axial motion of the shutter mechanism 42 along the common optical axis. The closure member 68 of the cartridge carrier 66 engages both the cartridge case 60 and the cartridge cover 62 for closing the peripheral opening 54 and for completing a substantially uninterrupted annular periphery of the shutter assembly 24 that prevents the undesirable ingress of light. Fastening screws 76 extend through the closure member 68 of the cartridge carrier 66 into engagement with the cartridge case 60 for securing the shutter mechanism 42 within the shutter housing 40.

In addition to aligning and securing the shutter mechanism 42 within the shutter housing 40, the shutter housing 40 separately provides for aligning and securing the camera body 20 and the lens 22 to its opposite ends 48 and 50. As a result, the shutter mechanism 42 can be disengaged from the shutter housing 40 and entirely removed from the shutter housing 40 through the peripheral opening 54 without disturbing the optical alignment between the camera body 20 and the lens 22. Once removed, the shutter mechanism 42 can be cleaned, repaired, upgraded, or even replaced; and the same or a replacement shutter mechanism can be reinserted through the peripheral opening 54 into engagement with the mounting and locating features of the shutter housing 40 for realigning the shutter mechanism 42 with the camera body 20 and the lens 22.

The shutter assembly 24 can be incorporated into a variety of different optical systems allowing the shutter mechanism 42 to be removed from the shutter housing 40 and later replaced without altering the optical alignment between the shutter housing 40 and adjoining optical components of the optical systems. Such optical systems include machine vision systems, microscopes, video imaging equipment, and other optical systems having optical components requiring alignment to produce good results. The portion of the shutter assembly 24 responsible for maintaining alignment with the adjoining optical components, namely, the shutter housing 40, remains fixed within the optical systems despite the removal or reinsertion of the shutter mechanism 42. The features of the shutter housing 40 responsible for locating and securing the shutter mechanism 42 differ from the features of the shutter housing 40 responsible for maintaining its position within the optical systems.

Although the above-described embodiment of the invention has been illustrated with particular features for performing the alignment and fastening functions, those of skill in the art will appreciate that the shutter assembly 24 can be readily adopted for connection to other optical components, and the mounting features within the shutter assembly 24 can themselves be modified to accommodate variations in shutter mechanisms 42 as well as to provide other ways for locating and securing the shutter mechanisms 42 in place within the shutter housings 40.

What is claimed is:

1. A camera and lens system having a replaceable shutter, comprising:
   a camera for capturing optical information;
   a lens system in optical alignment with the camera for relaying optical information to the camera;
   a shutter assembly for regulating passage of light through an aperture between the camera and the lens system, the shutter assembly including:
   a shutter housing mounted between the camera and the lens system; and
   a shutter mechanism; and
   the shutter mechanism being both receivable by the shutter housing in a position for regulating the passage of light through the aperture and removable from the shutter housing without disturbing the optical alignment between the camera and the lens system.

2. The system of claim 1 in which the shutter housing maintains the optical alignment between the camera and the lens system while the shutter mechanism is received by or removed from the shutter housing.

3. The system of claim 1 in which the shutter housing and shutter mechanism include mating features for locating the shutter mechanism in optical alignment with the camera and the lens system.

4. The system of claim 3 in which the camera and the lens system are aligned along a common optical axis and the mating features center the shutter mechanism within the aperture and constrain angular motion of the shutter mechanism about the common optical axis.

5. The system of claim 1 in which the shutter housing includes an exterior opening through which the shutter mechanism can be received and removed.

6. The system of claim 5 in which the shutter housing includes a first end connected to the camera and a second end connected to the lens system for maintaining optical alignment between the camera and the lens system.

7. The system of claim 6 in which the lens system is both detachable from and re-attachable to the second end of the shutter housing.

8. The system of claim 1 in which (a) the shutter mechanism is supported in a cartridge carrier and (b) the shutter housing includes a cartridge case having an axial opening for passing light through the aperture and a peripheral opening for receiving and removing the cartridge carrier.

9. The system of claim 8 in which the shutter housing includes a cartridge cover also having an axial opening for passing light through the aperture, and the cartridge cover and the cartridge case are assembled together preserving the peripheral opening for receiving and removing the cartridge carrier.

10. The system of claim 9 in which the cartridge carrier closes the peripheral opening and completes an eternal peripheral surface of the shutter housing.

* * * * *